June 14, 1966     W. H. HAINER ET AL     3,255,893
MANIPULATOR BOOM SYSTEM

Filed July 10, 1963     4 Sheets-Sheet 1

INVENTORS
WILLIAM H. HAINER
EUGENE E. CONNORS
BY
L. MacRoy Lillehaugen
ATTORNEY

June 14, 1966
W. H. HAINER ET AL
3,255,893
MANIPULATOR BOOM SYSTEM
Filed July 10, 1963
4 Sheets-Sheet 2
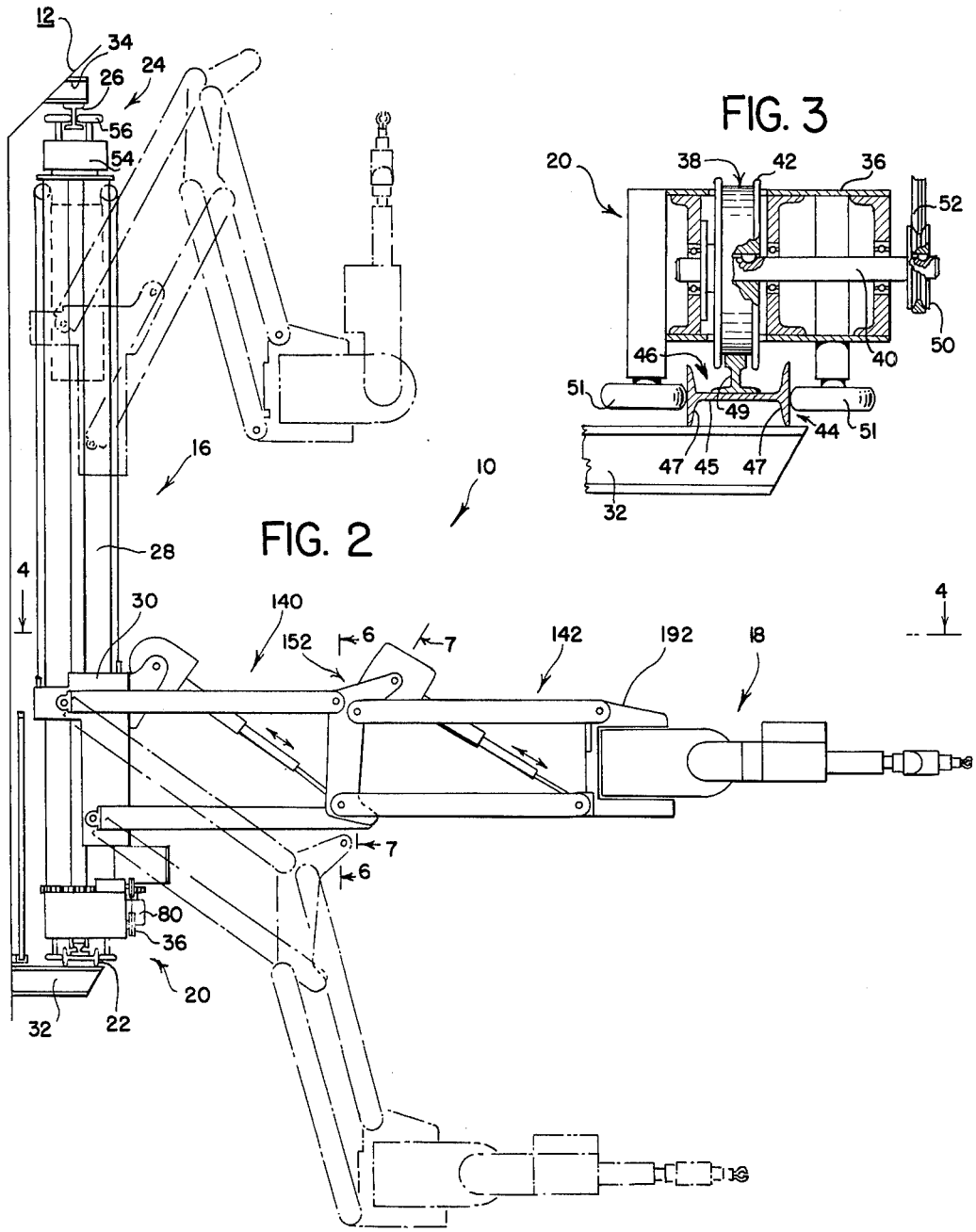
INVENTORS
WILLIAM H. HAINER
EUGENE E. CONNORS
BY
ATTORNEY June 14, 1966  W. H. HAINER ET AL  3,255,893
MANIPULATOR BOOM SYSTEM
Filed July 10, 1963  4 Sheets-Sheet 3

INVENTORS
WILLIAM H. HAINER
EUGENE E. CONNORS
BY
L. Malroy Lillehaugen
ATTORNEY

June 14, 1966   W. H. HAINER ET AL   3,255,893
MANIPULATOR BOOM SYSTEM
Filed July 10, 1963   4 Sheets-Sheet 4

INVENTORS
WILLIAM H. HAINER
EUGENE E. CONNORS
BY
L. McRoy Lillehaugen
ATTORNEY

United States Patent Office 3,255,893
Patented June 14, 1966

3,255,893
MANIPULATOR BOOM SYSTEM
William H. Hainer and Eugene E. Connors, St. Paul, Minn., assignors to General Mills, Inc., a corporation of Delaware
Filed July 10, 1963, Ser. No. 294,041
5 Claims. (Cl. 214—1)

This invention pertains to a boom system for supporting and positioning a material handling unit, and more particularly to a remotely controlled folding boom system formed by a pair of kinematic chains of links for supporting and positioning a mechanical arm manipulator relative to a work piece or work load.

The use of mechanical arm manipulators for remote handling of substances or objects in uninhabitable environments, such as areas that are radioactive, toxic, high and low temperature, or vacuum in nature, is well known to those skilled in the art. Manipulators of this type are most commonly attached to an overhead bridge system which is adapted to move along a rail system. Manipulators have in the past, also been attached to a bridge or mast which is mounted for movement along a vertical wall mounted rail system, as well as to a vehicle which is freely movable about the work area.

One type of boom system for supporting and positioning a manipulator known to those skilled in the art, is a telescopic boom system which includes at least two members, an outer tubular member and an inner member which is projectable out of the outer member and which is movable along the longitudinal axis of the outer member. Additional components which form the mechanical arm manipulator are attached to the projecting end of the inner member, and the unit is adapted to simulate the movements of the human arm. This type of boom system has some limitations. For example, movement of the two members relative to each other is limited to a linear movement, i.e. along the longitudinal axis of the outer member, and other components and drive systems must be provided in order to achieve manipulations in an area other than directly in front of the boom system. Furthermore, a boom system formed from two members cannot be retracted to less than one-half of its extended length, i.e. less than the length of the outer tubular member; in addition, it will not maintain a member attached to the projecting end of the inner member at a constant attitude if the outer member is pivoted in a vertical plane about an axis normal to its longitudinal axis, unless additional controls and elements are provided. Another factor to be considered concerns the problems encountered when a telescopic boom system is attached to a vertical cell wall in such a manner that the longitudinal axis of the boom system is normal to the cell wall, rather than extending vertically as in an overhead bridge system. Such wall mounted boom systems must be designed so as to withstand lateral stresses on the boom system when manipulative tasks are being performed.

Accordingly, one object of the present invention is to provide a boom system for supporting and positioning a material handling unit.

Another object is to provide a folding boom system which includes at least one set of kinematic chains of links for supporting and positioning a manipulator.

A further object is to provide a boom system for supporting a mechanical arm manipulator which can be retracted to less than one half of its extended length.

A still further object is to provide a boom system adapted to position a manipulator in a vertical plane by the use of only two drive elements.

Another object is to provide a wall-mounted boom system, having an articulated manipulator attached to one end, which is adapted to maintain the manipulator end of the system at a constant attitude throughout the entire range of travel of the boom system.

Other objects and advantages of this invention will become apparent from a consideration of the following specification and drawings. Before proceeding with a detailed description of the invention however, a brief description of it will be presented.

Preferably, the boom system of the present invention is comprised of a pair of pantograph linkages which are connected together to form a foldable boom system. The boom system is attached at one end to a carriage, which is mounted on and movable along the longitudinal axis of a vertical bridge or mast, said bridge in turn being mounted for relative movement along a pair of horizontal rails. It must be realized however, that although the boom system is described in conjunction with a vertical bridge, an overhead bridge system might be used as well. Attached to the other end of the boom system is an articulated mechanical arm manipulator. By actuating appropriate actuators, the boom system, and more particularly the end to which the manipulator is attached, can be extended away from the wall, or retracted toward the wall to less than one half of its extended length, raised or lowered in a vertical plane about an axis parallel to the wall, while maintaining the manipulator at a constant attitude throughout the entire range of travel.

The invention will best be understood by reference to the following drawings, wherein:

FIGURE 2 is a side elevational view illustrating a boom system similar to that depicted in FIGURE 1;

FIGURE 3 is an enlarged partial view depicting the bridge mounted on the lower rail;

Figure 1:
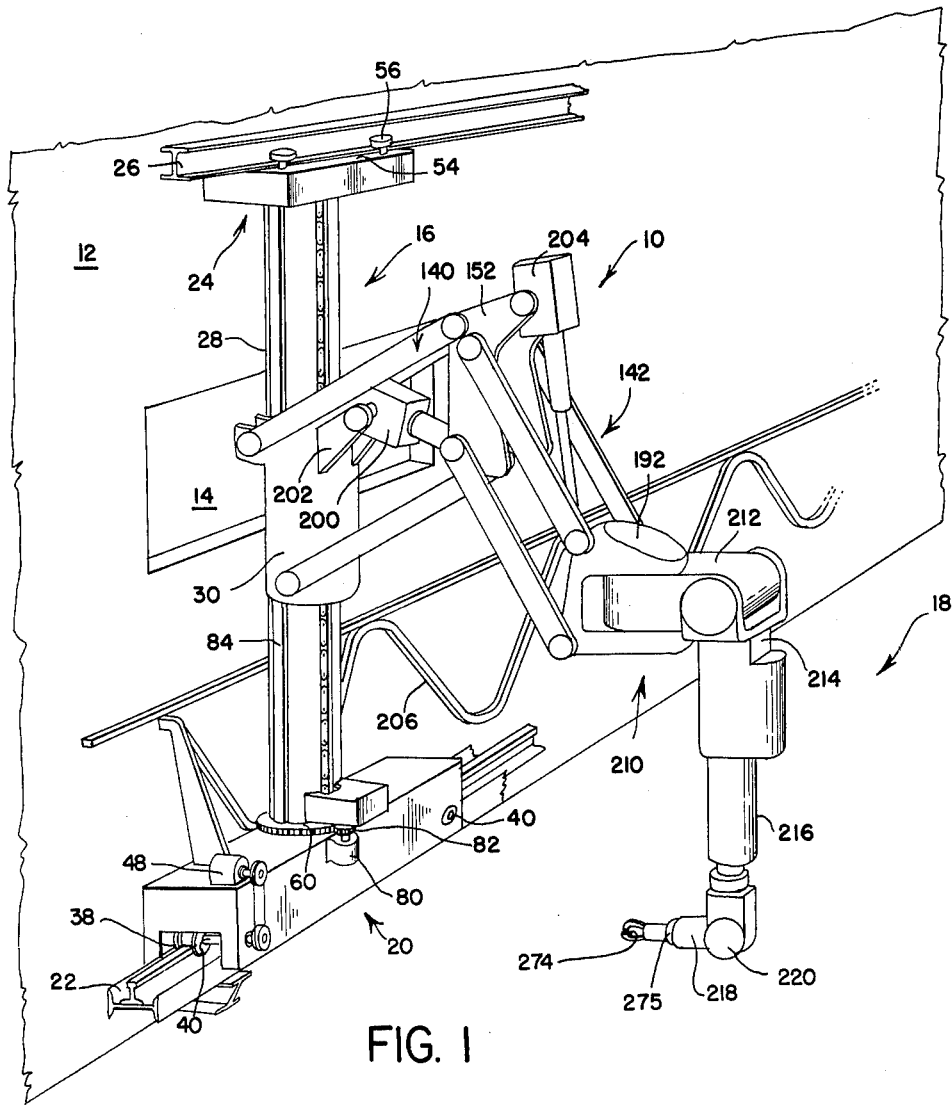
FIGURE 1 is a schematic perspective view illustrating the boom system attached to a vertical wall-mounted support structure.
Figure 4:
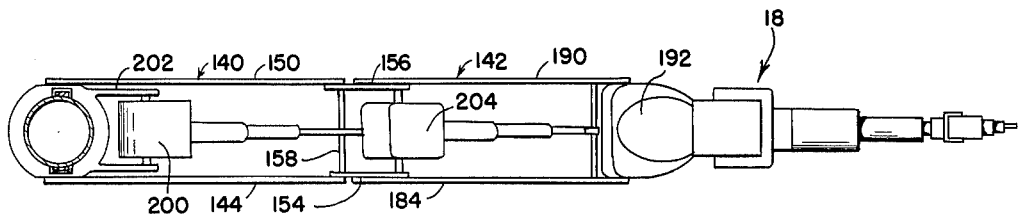
FIGURE 4 is a top plan view illustrating the boom system shown in FIGURE 2, taken along line 4—4 of FIGURE 2.

FIGURE 1 illustrates a boom system designated generally by reference numeral 10, attached for relative movement along a vertical cell wall 12. A window 14 is provided in the cell wall for enabling an operator behind the cell wall to view the work operations being performed. The boom system 10 is attached at one end to a support structure 16, and attached to the other end of the boom system is an articulated mechanical arm manipulator 18. The support structure 16 includes a lower truck assembly 20 mounted for relative movement along a lower rail system 22, an upper truck assembly 24 mounted for relative movement along an upper rail system 26, and a bridge member or mast 28 rotatably connected at its two ends to the lower and upper truck assemblies. A carriage 30 is attached to the bridge 28 and it is adapted to move along the longitudinal axis of the bridge 28. The carriage 30 serves as a mounting base or platform for attaching the boom system 10 to the support structure 16.

FIGURE 2 illustrates the structure in somewhat greater detail. The support structure 16 is mounted for relative movement along the horizontal rails 22 and 26, and it is adapted to move in a horizontal direction with respect to the cell wall 12. The lower rail 22 is attached to the wall 12 by means of a plurality of I-beams 32, and the upper rail 26 is attached to the wall 12 by means of a plurality of I-beams 34. FIGURE 2 also illustrates the boom system 10 and the manipulator 18 in different operating conditions, as shown by the broken lines.

The lower truck assembly 20 includes a frame 36 which is rotatably connected to the bridge 28. The frame 36 is movably mounted with respect to the rail system 22 by means of a pair of trolley wheels 38, which are fixedly attached to shafts 40, said shafts being rotatably mounted in the frame 36. The trolley wheels 38 are provided with two flanges 42 around their peripheries. The lower rail system 22 is comprised of a first elongate I-beam 44 having its longitudinal axis extending in a horizontal direction, parallel to the surface of the cell wall 12. The I-beam 44 is positioned on and attached to a plurality of the I-beams 32 so that an axis extending through the beam web 45 extends horizontally. The I-beam has two flanges 47. The I-beams 32 are attached to the wall 12 so that they extend perpendicularly away from the wall, and they support the I-beam 44 along the cell wall. A second I-beam 46 is positioned on the web 45 of the I-beam 44 so that an axis through the beam web 49 is perpendicular to the axis through the beam web 45. A pair of rollers 51 are rotatably mounted in the lower frame 36, in such a manner that they roll along the flanges 47 of the I-beam 44. The rollers 51, as well as the flanges 42 help prevent the truck assembly 20 from sliding off the rail 22, and they restrain the bridge 28 from tilting in a direction normal to the wall.

A motor 48 is operatively connected to a gear or sheave 50 fixedly connected to the shaft 40, by means of a chain or timing belt 52. As the motor 48 is energized, the shaft 40 is rotated about its longitudinal axis, thereby causing the truck 20 to move along the rail 22. In this connection, note that the motor 48 is operatively connected to only one of the shafts 40. It should be realized of course that if desired, the motor could be operatively connected to the other shaft as well, or if desired, it could be connected to both the shafts thereby providing a more positive drive along the rail system.

The upper truck assembly 24 includes a frame member 54 which is mounted for relative movement with respect to the upper rail 26. Note, that no trolley wheels, similar to the trolley wheels 38 mounted in the frame 36, are provided. A plurality of rollers 56 are rotatably mounted in the upper frame 54, in such a manner that the rail 26 is disposed between pairs of said rollers. As the upper truck assembly 24 moves relative to the upper rail 26, the rollers 56 roll along two surfaces of the rail 26; the rollers help to prevent the truck assembly 24 from sliding off the rail system 26, and they restrain the bridge from tilting in a direction normal to the wall.

Figure 8:
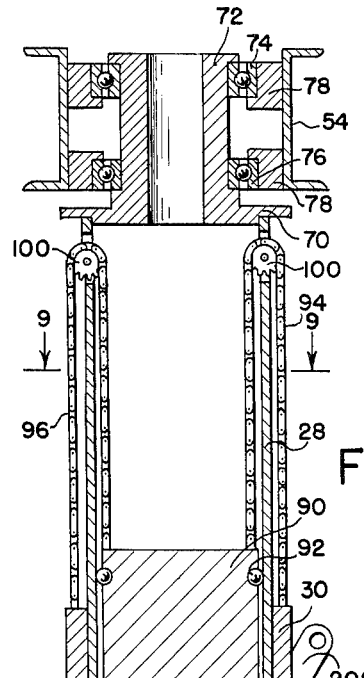
FIGURE 8 is a partial sectional view illustrating the bridge member in greater detail.

The bridge member 28 is rotatably connected at its ends to the truck assemblies 20 and 24. The lower end of the bridge 28 is secured to a spur gear 60 which includes an integral sleeve portion 62. The sleeve 62 is rotatably mounted relative to the frame 36 by means of a thrust bearing 64, and a bearing 66, note FIGURE 8. The bearing 64 is maintained adjacent to the spur gear 60 by a support block 68, in such a manner that the weight of the bridge 28, the boom system 10, and the like, is transferred to the lower truck assembly 20. The upper end of the bridge 28 is secured to a circular plate 70, which includes an integral sleeve portion 72. The sleeve 72 is rotatably mounted relative to the upper frame 54 by means of bearings 74 and 76, which are mounted relative to the frame 54 by mounting blocks 78. The bridge member 28, therefore connects the lower and upper truck assemblies together, and as the lower truck assembly 20 moves relative to the lower rail 22, the upper truck assembly 24 is likewise caused to move along the upper rail 26. The bridge 28 is adapted to rotate about its longitudinal axis with respect to the lower and upper truck assemblies, by virtue of the bearings 64, 66, 74, and 76. A motor 80, which is secured to the lower frame 36 by appropriate means, is provided with a pinion 82 which meshes with the spur gear 60. When the motor 80 is energized, the bridge 28 is caused to rotate about its longitudinal axis.

Figure 9:
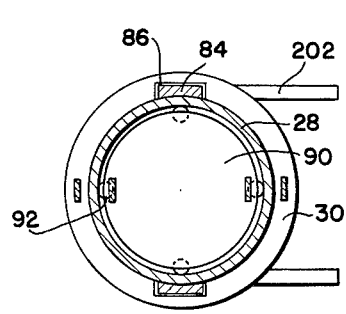
FIGURE 9 is a sectional view taken along line 9—9 of FIGURE 8.
Figure 10:
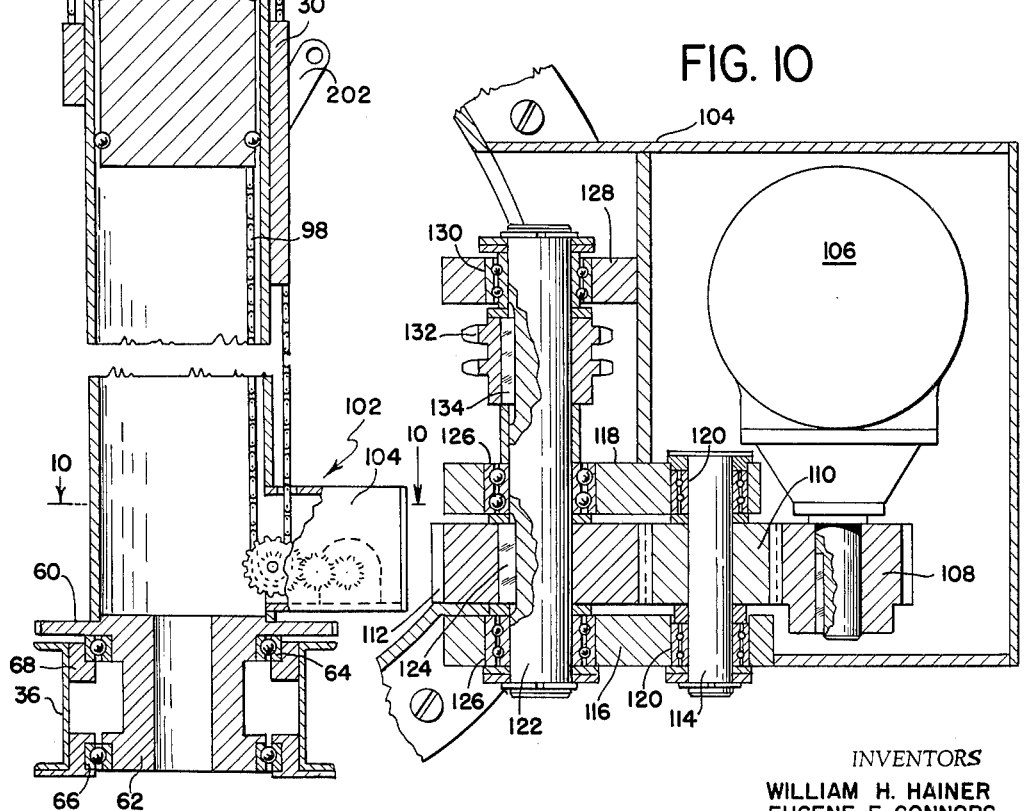
FIGURE 10 is an enlarged sectional view taken along line 10—10 of FIGURE 8.

The carriage 30 is mounted on the bridge 28 in such a manner that it is adapted to move along the longitudinal axis of the bridge 28. The bridge is provided with at least two guide rails 84 attached to its outer surface in such a manner that they extend along the longitudinal axis of the bridge 28; the carriage 30 on the other hand, is provided with accommodating recesses 86. The guide rails 84 and the recesses 86 permit the carriage 30 to slide relative to the bridge 28, but they prevent the carriage from rotating relative to the bridge, about the longitudinal axis of the bridge, note FIGURES 8–10.

The carriage 30 is caused to move along the longitudinal axis of the bridge by means of a drive assembly which includes a counterweight 90 slidably disposed within the bridge member 28. Rollers 92 aid in moving the counterweight 90 relative to the interior surface of the bridge 28. The weight of the counterweight is of sufficient magnitude so that preferably it weighs at least as much as the boom system 10, the manipulator 18, and a partial load, thereby aiding in balancing the system. The counterweight 90 is operatively connected to the carriage 30 by means of chains 94, 96, and 98. The chains 94 and 96 are connected at one end to the top surface of the counterweight 90 by appropriate means, and at their other end to the carriage 30. Each chain partially encircles a pulley 100 rotatably mounted in the bridge member 28. The chain 98 is connected at one end to the bottom surface of the counterweight 90 by appropriate means, and at its other end to the carriage 30. The chain 98 is operatively connected to a carriage hoist system designated generally by reference numeral 102. In this connection it must be realized that although the use of chains is described herein, other types of connections such as cables or the like might be used as well.

The carriage hoist system includes a housing 104 secured to the bottom end of the bridge 28 in such a manner that it is adapted to rotate about the longitudinal axis of the bridge when the bridge is rotated. Positioned within the housing 104 is a drive motor 106 having a drive pinion 108 keyed onto its output shaft, an idler pinion 110, and a spur gear 112. The idler pinion 110 is mounted on a shaft 114, which is rotatably mounted in support members 116 and 118 by means of bearings 120. The spur gear 112 is fixedly attached to a shaft 122 by means of a key 124. The shaft 122 is rotatably mounted in the support members 116 and 118 by means of bearings 126, as well as in a support member 128, by means of a bearing 130. A sprocket 132 is fixedly attached to the shaft 122 by means of a key 134, and the chain 98 is partially encircled around the sprocket 132 in such a manner that the sprocket teeth engage the chain links.

Figure 6:
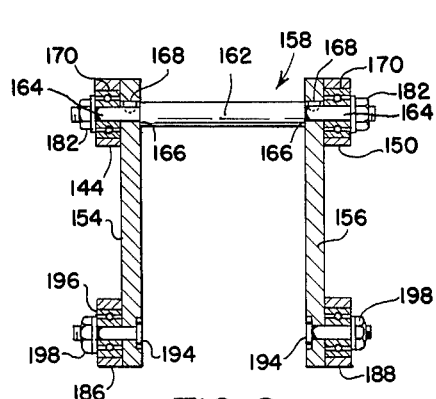
FIGURE 6 is a partial sectional view taken along line 6—6 of FIGURE 2.
Figure 7:
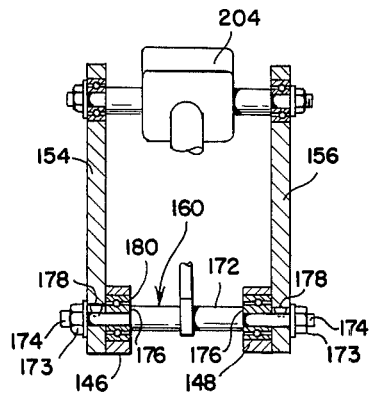
FIGURE 7 is a partial sectional view taken along line 7—7 of FIGURE 2.
Figure 5:
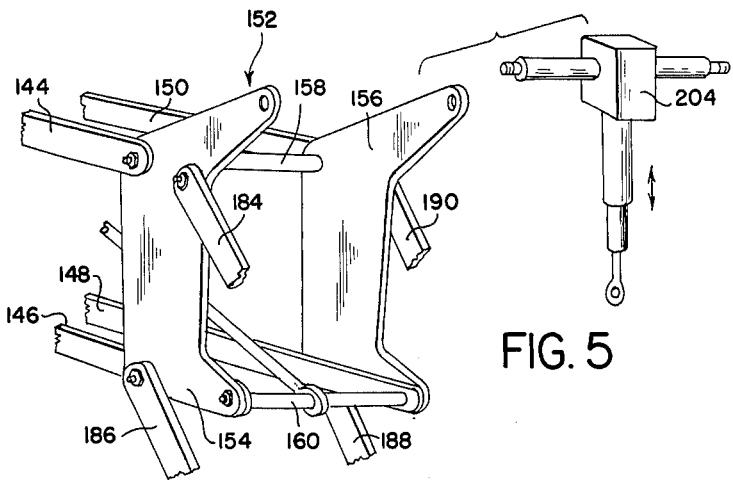
FIGURE 5 is a partial perspective view illustrating part of the boom system in greater detail.

The boom system 10 is comprised of a first pantograph linkage 140 and a second pantograph linkage 142. Each linkage is formed from a plurality of fixed length arms or rods and end members connected together to form first and second parallelograms. The first pantograph linkage 140 is formed from a framework of arms 144, 146, 148, and 150, and an end frame 152. The end frame 152 is formed from two members 154 and 156, which are separated from each other by means of rods 158 and 160. The rod 158 includes a first portion 162, and two smaller end portions 164, which form shoulders 166 with the first portion 162. The members 154 and 156 are fixedly attached to the rod 158, for example by keys 168, so that the members 154 and 156 abut against the shoulders 166, note FIG. 6. The arms 144 and 150 are rotatably attached at one of their ends to the ends 164 of the rod 158; bearings 170 permit relative rotation between the arms and the rod 158. The rod 160 likewise includes a first portion 172, and two smaller end portions 174, which form shoulders 176 with the first portion 172. The members 154 and 156 are fixedly attached to the rod 160, for example by keys 178. The arms 146 and 148 are rotatably attached at one of their ends to the ends 174 of the rod 160; bearings 180 permit relative rotation between the arms and the rod 160. The arms 146 and 148 are disposed between the shoulders 176 and the members 154 and 156 so that the shoulders 166 abut against the arms 146 and 148, rather than against the members 154 and 156, note FIG. 7. Lock-nut and washer assemblies 173 maintain the end frame 152 and the arms in assembled relationship. The second ends of the arms 144–150 are rotatably attached to the carriage 30.

The second pantograph linkage 142 is formed from a framework of arms 184, 186, 188 and 190, and an end frame or U-shaped yoke 192. The arms 186 and 188 are rotatably attached at one of their ends to the lower portion of the end frame 152 by means of bolts 194. The bolts 194 are fixed relative to the members 154 and 156 against relative rotation, and their head portions are countersunk, thereby providing a smooth inner surface for the members 154 and 156. Bearings 196 permit the arms 186 and 188 to rotate with respect to the end frame 152. Lock-nut and washer assemblies 198 maintain the end frame 152 and the arms in assembled relationship. The arms 184 and 190 are rotatably attached at one of their ends to the upper portion of the end frame 152 in substantially the same manner as the arms 186 and 188. The second end of the arms 184–190 are rotatably attached to the yoke 192.

A first actuator 200 is pivotally attached to the carriage 30 by means of brackets 202. The actuator 200 is operatively connected to the lower portion of the end frame 152, by attachment to the rod 160. When the actuator 200 is actuated, the first pantograph linkage 140 can be pivoted relative to the carriage 30, and the end frame 152 is caused to move in a vertical plane about an axis perpendicular to the longitudinal axis of the bridge 30. A second actuator 204 is pivotally attached to the upper portion of the end frame 152 and it is operatively connected to the lower portion of the yoke 192. When the actuator 204 is actuated, the second pantograph linkage can be pivoted relative to the end frame 152, and the yoke 192 is caused to move in a vertical plane about an axis perpendicular to the longitudinal axis of the bridge 30.

Various types of actuators might be used for imparting movement to the pantograph linkages. For illustrative purposes, telescopic actuators which are projectable and retractable are shown. Actuators of this type are generally well known to those skilled in the art, and they will not be shown or described in detail; one type of such actuator commonly used for example, is a hydraulic actuator. Various types of actuators require the use of some type of cable system by which the fluid medium, current, or the like is transmitted to the actuator. A cable system 206, attached to the wall 12, is used to supply power to the various actuators as the bridge moves along the rail 22 and 26. This type of cable system is likewise known to those skilled in the art and will not be described in detail.

The manipulator 18 is attached to the boom system 10 by means of a universal joint 210 which includes the second end frame or yoke 192 and a support member 212. The support member 212 is pivotally connected to the yoke 192 and it is adapted to pivot about a vertical axis with respect to the yoke 192. The manipulator includes a first portion or yoke 214 which is pivotally connected to the support member 212, and it is adapted to pivot or rotate about an axis normal to the pivotal axis of the support member 12 relative to the yoke 192. The manipulator 18 includes an upper arm 216 rotatably and reciprocally connected to the yoke 214, and a lower arm 218 pivotally attached to the upper arm to form an elbow 220. A hand 222 having a grip mechanism 224 attached thereto, is rotatably connected to the lower arm 218. Manipulators of this type are generally well known to those skilled in the art and will not be described in further detail. The various relative movements described above are accomplished by means of appropriate actuators (not shown in the drawings).

In operation, the articulated manipulator 18 is positionable adjacent to a work piece, and it is adapted to perform numerous manipulative functions. The bridge 28, the lower truck assembly 20, and the upper truck assembly 24 are movable along the lower and upper rails by energizing the motor 48. The shaft 40 and the trolley wheels 38, which are operatively connected to the motor 48 are caused to rotate about the longitudinal axis of the shaft when the motor 48 is energized. Since the trolley wheels 38 roll along the I-beam 46, the lower truck assembly 20 is caused to move along the lower rail of 22. Relative movement of the lower truck assembly 20 causes the upper truck assembly 24 to move in the same direction.

By energizing the motor 80, the bridge 28 can be pivoted about the longitudinal axis of the bridge 28. As noted in FIGURE 1, the pinion 82 meshes with the spur gear 60; as the motor 80 is energized, the pinion 82 drivingly engages the spur gear 60 thus pivoting the bridge about its longitudinal axis. Pivotal movement of the bridge 28 in this manner, causes the boom system 10 and the manipulator 18 to swing through a horizontal plane, thereby circumscribing an arc about the bridge axis. By pivoting the bridge 90° in either direction from that shown in FIGURE 2, the boom system 10 can be positioned relative to the wall 12 so that it extends substantially parallel to the wall 12.

The carriage 30 is movable along the longitudinal axis of the bridge 28 by means of the motor 106 positioned in the housing 104. By energizing the motor 106, the shaft 122 and the sprocket 132 are caused to rotate about the axis of the shaft 122. Rotation of the sprocket 132 causes the carriage 30, and the counterweight 90 positioned within the bridge 28, to move along the longitudinal axis of the bridge, by means of the chain 98 which is engaged by the sprocket 132. For example, when the sprocket 132 is rotated in a clockwise direction, as viewed in FIGURE 8, the carriage 30 is pulled down, and the counterweight 90 is caused to move up by means of the chains 94 and 96 which operatively connect the top of the counterweight 90 to the top of the carriage 30. Conversely, when the sprocket 132 is rotated in a counter-clockwise direction, the counterweight 90 is pulled down, and the carriage 30 is caused to move up. Thus the boom system 10 and the manipulator 18 can be raised or lowered along the longitudinal axis of the bridge 28.

The boom system 10 connects the manipulator 18 to the carriage 30 mounted on the vertical bridge 28. As illustrated in FIGURES 1 and 2, the boom system 10, and more particularly the manipulator 18, can be extended or retracted, raised or lowered, by actuating the actuators 200 and 204. The pantograph linkages 140 and 142 maintain the universal joint 210, and consequently the manipulator 18, at a constant attitude while either the linkage 140 or 142 is moved by its respective actuator 200 or 204.

By actuating the actuator 200 so that the telescopic members are projected, the pantograph linkage 140, and more particularly the end frame 152 is lowered. Conversely, when the telescopic members of the actuator 200 are retracted, the end frame 152 is raised. In a like manner, actuating the actuator 204 so that the telescopic members are projected, the pantograph linkage 142, and more particularly the yoke 192 is lowered. Conversely, when the telescopic members of the actuator 204 are retracted, the yoke 192 is raised. Note FIGURE 2 which illustrates the pantograph linkages in different folded positions. Note further that due to the constant lengths of arms 144–150 and 184–190, the end frame 152 and the yoke 192 are maintained at a constant attitude throughout the entire range of travel.

The boom system 10 facilitates manipulative tasks and the handling of objects by the manipulator 18. The manipulator end of the boom system can be extended or retracted, raised or lowered, by the use of only two drive elements; the boom system can be retracted to less than one-half its extended length, thereby producing a more versatile system; and the boom system will maintain a manipulator attached to the manipulator end of the boom system at a constant attitude throughout the entire range of travel of the boom system.

In the above description and the attached drawings, a disclosure of the principles of this invention is presented, together with some of the embodiments by which the invention may be carried out.

What is claimed is:

1. A support structure comprising a pair of parallel rails, an elongate mast, means for mounting said mast for relative movement along the longitudinal axes of said rails, the longitudinal axis of said mast being normal to the axes of the rails, a carriage, means for mounting said carriage for relative movement along the longitudinal axis of the mast, a first pantograph linkage, means for pivotally connecting said linkage to the carriage, actuator means for pivoting said linkage relative to the carriage, a second pantograph linkage, means for pivotally connecting said second linkage to the first pantograph linkage, actuator means for pivoting said second linkage relative to the first linkage, said second linkage being pivotable with respect to the first linkage so that its longitudinal axis can be aligned with respect to the longitudinal axis of said first linkage regardless of the angular orientation of said first linkage, an articulated manipulator, and means for attaching the manipulator to the second linkage, the manipulator end of the second linkage being maintained at a constant attitude as the first and second pantograph linkages are pivoted.

2. A wall-mounted support structure comprising a pair of parallel rails, means for attaching said rails to a vertical wall, a vertical mast mounted for horizontal movement along the horizontal axes of said rails, a carriage mounted for vertical movement along said mast, a first pantograph linkage, means for pivotally connecting a first end of said linkage to the carriage, actuator means for pivoting said linkage relative to the carriage, a second pantograph linkage, means for pivotally connecting a first end of said second linkage to a second end of said first pantograph linkage, actuator means for pivoting said second linkage relative to the first linkage, the second linkage being pivotable with respect to the first linkage so that the ends of each linkage lie along a common line, an articulated manipulator, and means for attaching the manipulator to a second end of said second linkage, the manipulator end of the second linkage being maintained at a constant attitude as the first and second pantograph linkages are pivoted.

3. A wall-mounted boom system for supporting a manipulator mounted for movement relative to a pair of parallel rails, means for attaching said rails to a vertical wall, a vertical mast, means for mounting said mast on said rails for horizontal movement along the longitudinal axes of said rails, means for pivoting said mast about a vertical axis, a carriage, means for mounting said carriage on said mast for vertical movement along said vertical axis, the boom system including a first pantograph linkage, said linkage including a plurality of arms and an end frame, means for pivotally connecting a first end of said arms to the carriage and the second end of said arms to the end frame thereby forming a first parallelogram, first actuator means for pivoting said linkage relative to the carriage, a second pantograph linkage, said second linkage including a plurality of arms and a yoke member, means for pivotally connecting a first end of said arms to the end frame and the second end of said arms to the yoke member, thereby forming a second parallelogram, second actuator means for pivoting said second linkage relative to the first linkage, and means for attaching the manipulator to the yoke member, said yoke member being maintained at a constant attitude as the first and second pantograph linkages are pivoted.

4. The combination of claim 3 wherein means is provided for attaching the first actuator to the carriage and means is provided for operatively connecting it to the end frame, and means is provided for attaching the second actuator to the end frame and means is provided for operatively connecting it to the yoke member.

5. The combination of claim 3 wherein a universal joint is interposed between the yoke member and the manipulator.

References Cited by the Examiner

UNITED STATES PATENTS 1,554,584 9/1925 Lake.
2,500,815 3/1950 Gerli et al.
2,674,500 4/1954 Hukari.

FOREIGN PATENTS 1,180,090 12/1958 France.

GERALD M. FORLENZA, *Primary Examiner.*

HUGO O. SCHULZ, *Examiner.*

R. G. SHERIDAN, *Assistant Examiner.*